(12) United States Patent
Haines

(10) Patent No.: US 12,554,952 B1
(45) Date of Patent: Feb. 17, 2026

(54) SYSTEMS AND METHODS FOR HIGHER SCAN RATES OF HUMAN AIMED SCANNERS IN VARIOUS ENVIRONMENTS

(71) Applicant: Datalogic USA, Inc., Eugene, OR (US)

(72) Inventor: Scott William Haines, Eden Prairie, MN (US)

(73) Assignee: Datalogic USA, Inc., Eugene, OR (US)

( * ) Notice: Subject to any disclaimer, the term of this patent is extended or adjusted under 35 U.S.C. 154(b) by 0 days.

(21) Appl. No.: 18/957,694

(22) Filed: Nov. 23, 2024

(51) Int. Cl.
*G06K 7/10* (2006.01)
*G06K 7/14* (2006.01)

(52) U.S. Cl.
CPC .................................. *G06K 7/1404* (2013.01)

(58) Field of Classification Search
None
See application file for complete search history.

(56) References Cited

U.S. PATENT DOCUMENTS

| | | | |
|---|---|---|---|
| 6,808,114 B1 | 10/2004 | Palestini et al. | |
| 7,075,663 B2 | 7/2006 | Canini et al. | |
| 8,573,497 B2 | 11/2013 | Gao et al. | |
| 9,672,398 B2* | 6/2017 | Gillet | G06K 7/10831 |
| 10,726,225 B2* | 7/2020 | Albanese | G06K 7/10386 |
| 11,188,122 B2 | 11/2021 | Paufler | |
| 2007/0176003 A1* | 8/2007 | Brock | G06K 7/10801 235/462.24 |
| 2013/0146666 A1* | 6/2013 | Ding | G06K 7/10732 235/455 |
| 2013/0292477 A1* | 11/2013 | Hennick | G06K 7/1098 235/469 |
| 2015/0339506 A1* | 11/2015 | Chen | G06K 7/10811 235/462.21 |

OTHER PUBLICATIONS

Apple Inc., iPhone SE—Technical Specifications, https://www.apple.com/iphone-se/specs/, Apple.com web page, originally accessed Dec. 28, 2021, retrieved Jul. 10, 2024, 9 pgs.

(Continued)

*Primary Examiner* — Thien M Le
*Assistant Examiner* — April A Taylor
(74) *Attorney, Agent, or Firm* — Foley & Lardner LLP

(57) ABSTRACT

A code reader may include an image sensor to image a scene with a machine-readable indicia, an aimer illuminator to output an aiming signal to cause an aiming pattern, and at least one processor to enable the aimer illuminator to output the aiming signal. The aiming signal may be longer in at least one dimension than a width of a face of an electronic device at a defined distance on which the machine-readable indicia is displayed to enable the aiming signal to illuminate an edge of the electronic device to enable a user to visually identify the aiming signal. The processor(s) may cause the image sensor to capture an image of the scene inclusive of the machine-readable indicia being displayed on an electronic display to generate image data, and cause a notification of the machine-readable indicia being successfully decoded to be generated to notify the user.

20 Claims, 9 Drawing Sheets

(56) References Cited

OTHER PUBLICATIONS

Brochure for AirTrack S2, https://cdn.barcodesinc.com/themes/barcodesinc/pdf/AirTrack/s2.pdf, undated, originally accessed Nov. 1, 2022, retrieved Nov. 1, 2022, 3 pgs.
Brochure for Honeywell Xenon XP 1950g, https://cdn.barcodesinc.com/themes/barcodesinc/pdf/Honeywell/xp-1950g-2021.pdf, Jan. 2021, retrieved Nov. 1, 2022, 2 pgs.
Brochure for Zebra DS8100, https://cdn.barcodesinc.com/themes/barcodesinc/pdf/Zebra/ds8100-new.pdf, Aug. 12, 2019, retrieved Jul. 10, 2024, 4 pgs.
Fitts, P. M., The Information Capacity of the Human Motor System in Controlling the Amplitude of Movement, Journal of Experimental Psychology [J Exp Psychol] Jun. 1954; vol. 47 (6), pp. 381-391, https://www2.psychology.uiowa.edu/faculty/mordkoff/infoproc/pdfs/Fitts%201954.pdf, Jun. 1954, retrieved Jul. 10, 2024, 11 pgs.
Kopper, Understanding and Improving Distal Pointing Interaction, A dissertation submitted to the faculty of Virginia Polytechnic Institute and State University in partial fulfillment of the requirements for the degree of Doctor of Philosophy In Computer Science and Applications, https://vtechworks.lib.vt.edu/bitstream/handle/10919/28183/Kopper_RAP_D_2011.pdf?sequence=1&isAllowed=y, Jun. 9, 2011, retrieved Jul. 10, 2024, 206 pgs.
Wikipedia, Diffuse Reflection, https://en.wikipedia.org/w/index.php?title=Diffuse_reflection&oldid=1055411516, From Wikipedia, the free encyclopedia, last edited Nov. 15, 2021, retrieved Jul. 10, 2024, 2 pgs.
Wikipedia, Fitts's Law, From Wikipedia, the free encyclopedia, https://en.wikipedia.org/w/index.php?title=Fitts%27s_law&oldid=1070319896, last edited Feb. 6, 2022, retrieved Jul. 10, 2024, 4 pgs.
Wikipedia, Liquid-crystal display, https://en.wikipedia.org/w/index.php?title=Liquid-crystal_display&oldid=1062807680, From Wikipedia, the free encyclopedia, last edited Dec. 30, 2021, retrieved Jul. 10, 2024, 11 pgs.
Wikipedia, OLED, https://en.wikipedia.org/w/index.php?title=OLED&oldid=1065171809, From Wikipedia, the free encyclopedia, last edited on Jan. 12, 2022, retrieved Jul. 10, 2024, 13 pgs.
Wikipedia, Specular Reflection, https://en.wikipedia.org/w/index.php?title=Specular_reflection&oldid=1055753614, From Wikipedia, the free encyclopedia, last edited Nov. 17, 2021, retrieved Jul. 10, 2024, 2 pgs.

\* cited by examiner

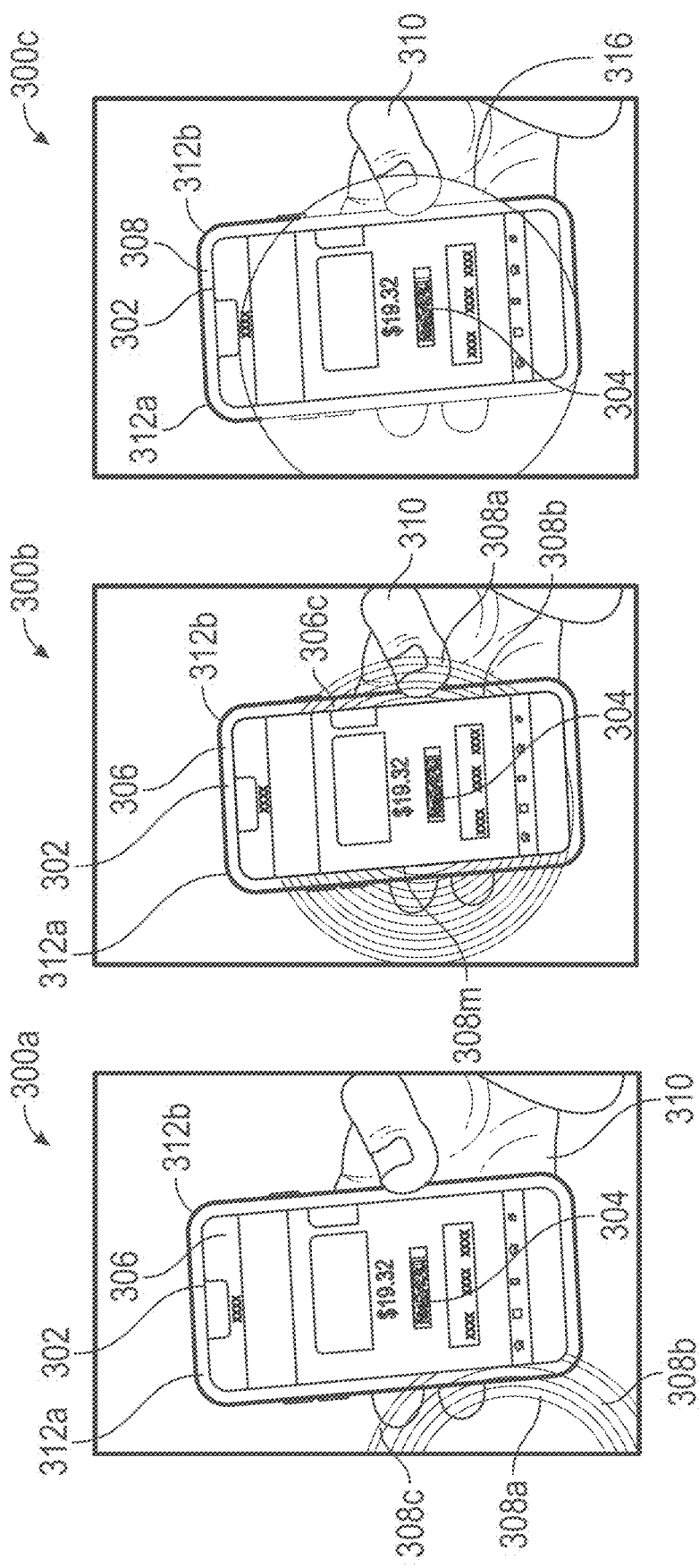

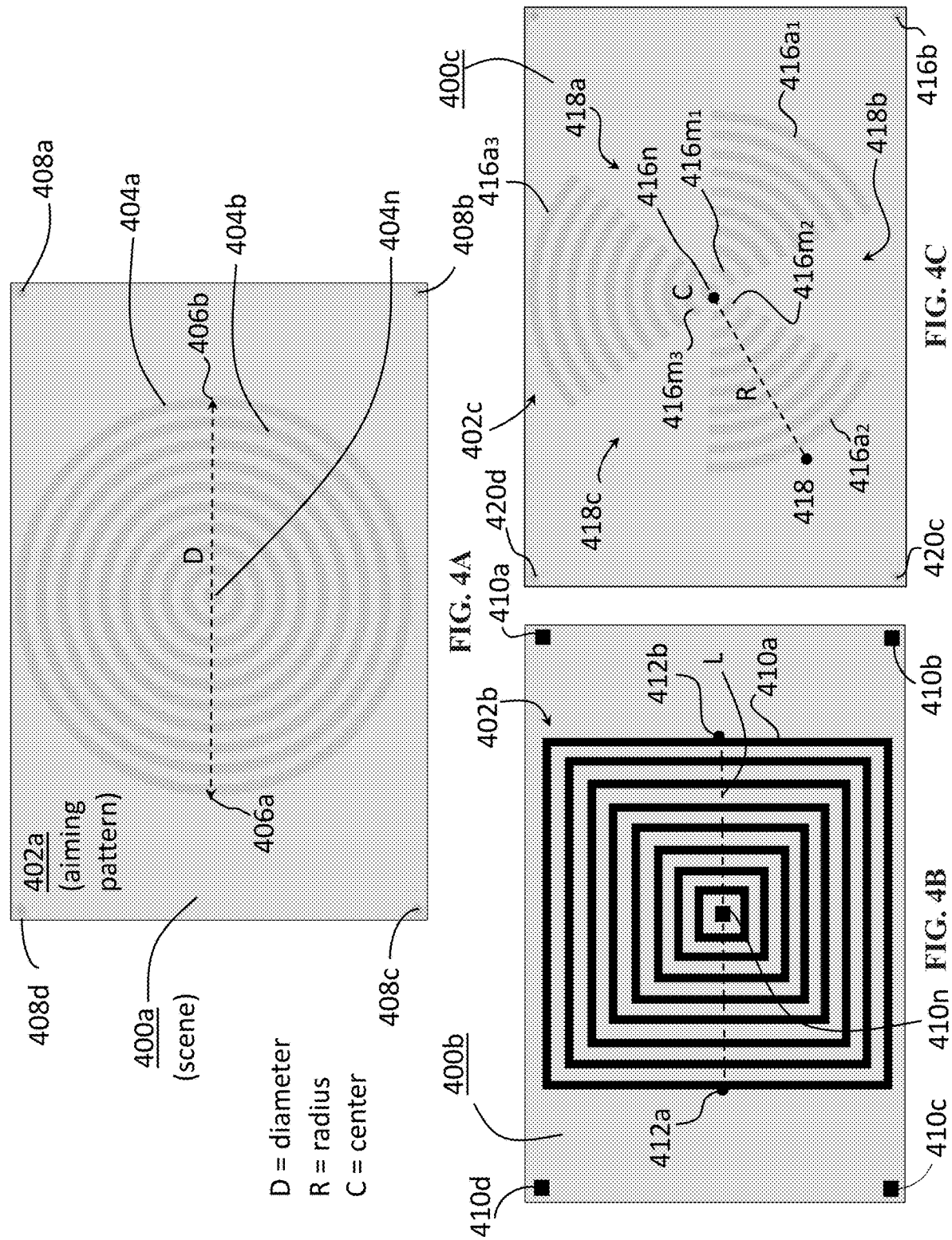

SYSTEMS AND METHODS FOR HIGHER SCAN RATES OF HUMAN AIMED SCANNERS IN VARIOUS ENVIRONMENTS

TECHNICAL FIELD

The present disclosure relates generally to scanners or code readers, and more particularly, to simplified self-checkout systems and related methods.

BACKGROUND

A barcode scanning system generally enables users to aim a scanner or code reader accurately at machine-readable indicia, such as barcodes, to ensure successful scanning. To assist with this scanning process, many systems employ an aiming light that projects a small, precise target, generally known as an aiming signal, often in the form of crosshairs, onto a surface on which the machine-readable indicia or code is located. The purpose of the aiming signal is to help the user aim the scanner at the code for efficient and accurate decoding thereof. However, when scanning codes displayed on electronic devices, such as mobile phones or tablets, the visibility of the aiming signal can be significantly diminished or by an electronic display of the electronic display. The reflective or emissive properties of electronic displays may prevent the aiming signal from being visible, thereby leading to difficulties in aligning the scanner and potentially causing failed or inefficient scans. As such, there is a need to improve the visibility and effectiveness of the aiming signal for barcode scanners, particularly when used with electronic display screens.

BRIEF SUMMARY

To overcome the shortcomings of current barcode scanning processes, the systems, methods, devices, and principles described herein provide for an aiming signal that overcomes the shortcomings of traditional aiming signals when scanning machine readable indicia displayed on electronic displays of electronic devices, such as mobile phones. The described approach addresses the challenges of accurately aiming barcode scanners on electronic displays that emit or reflect light, ensuring that users can move effectively capture the machine-readable indicia using the improved aiming signal.

More specifically, systems and methods are disclosed for improving aiming and reading rates of human-aimed scanners in various environments. In particular, a code reader may include an image sensor configured to image a scene in which a machine-readable indicia is to be positioned. The code reader may include an aimer illuminator configured to output an aiming signal to cause an aiming pattern to be displayed on an illustrated surface. The code reader may include at least one processor in communication with the image sensor and aimer illuminator and configured to enable the aimer illuminator to output the aiming signal. The aiming signal may be longer in at least one dimension than a width of a face of an electronic device including an electronic display at a defined distance on which the machine-readable indicia is displayed with the aiming pattern to enable the aiming signal to illuminate at least one edge of the electronic device outside of the electronic display to enable a user to visually identify locations of the aiming signal. The processor(s) may be configured to cause the image sensor to capture an image of the scene inclusive of the machine-readable indicia being displayed on the electronic display to generate image data inclusive of the machine-readable indicia, and decode the machine-readable indicia. In response to successfully decoding the machine-readable indicia, a notification of the machine-readable indicia being successfully decoded may be generated to notify the user of the successful decoding.

Another embodiment relates to a method for imaging, by an image sensor of a code reader, a scene in which a machine-readable indicia is to be positioned. An aimer illuminator of the code reader may output an aiming signal. The aimer illuminator may be enabled to output the aiming signal, the aiming signal forming an aiming pattern being longer in at least one dimension than a width of an electronic device including an electronic display at a defined distance on which the machine-readable indicia is displayed to enable the aiming signal to illuminate at least one edge of the electronic device with the aiming pattern to enable a user to visually identify locations of the aiming signal. The image sensor may capture an image of the scene inclusive of the machine-readable indicia being displayed on the electronic display. Image data inclusive of the machine-readable indicia may be generated and decoded. In response to successfully decoding the machine-readable indicia, a notification of the machine-readable indicia being successfully decoded may be generated to notify the user of the successful decoding.

BRIEF DESCRIPTION OF THE FIGURES

Illustrative embodiments of the present invention are described in detail below with reference to the attached drawing figures, which are incorporated by reference herein and wherein:

FIG. 3A-3C are illustrations of illustrative scanning environments with an aiming signal illuminating edges of (i) an electronic display or (ii) hand features holding the electronic display to support aiming of the code reader;

FIGS. 4A-4C are illustrations of illustrative aiming patterns outputs by code readers;

DETAILED DESCRIPTION

Figure 1:
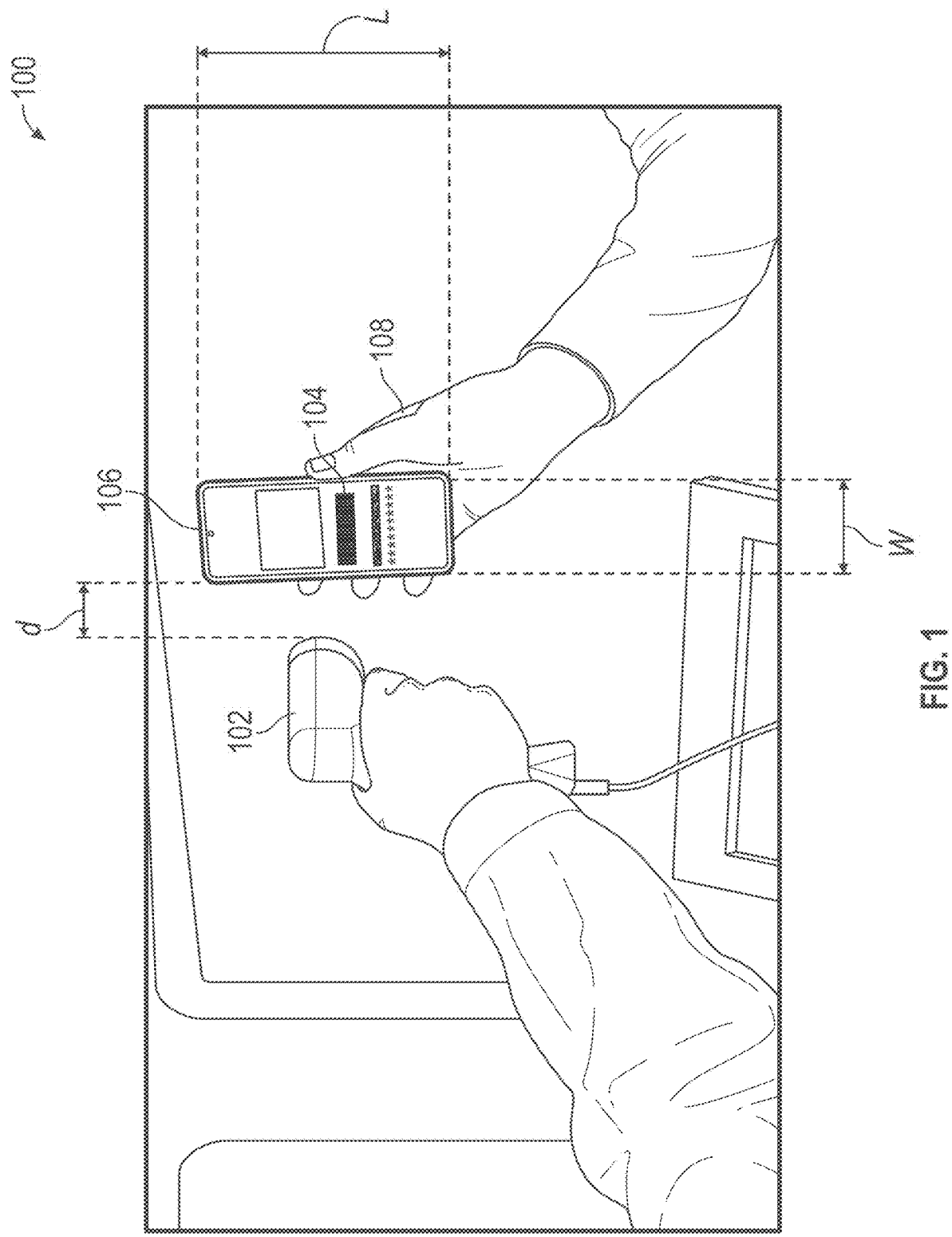
FIG. 1 is an illustration of an illustrative scanning environment with a code reader scanning a machine-readable indicia displayed on an electronic device.

Barcode scanning systems (e.g., code readers, scanners, etc.) may output an aiming signal to enable a user to aim the code reader at a machine-readable indicia (e.g., barcode, QR code, etc.) in advance of capturing an image (in any format) of the machine-readable for decoding. Historically, a code reader may output a light pattern with small crosshairs or other shape to provide a visual indication of a field-of-view of the code reader or a target area (e.g., a central area within the field-of-view) for the user to use in aiming the code reader. Conventional aiming patterns often attempt to match the boundaries of the field-of-view or be smaller than the field-of-view in order to prompt the user to place the indicia within the aiming pattern to ensure it is fully within the field-of-view of the imager. Typically the aiming signal is small so that the intensity is high to enable better visibility by the user. However, such aiming signals may become difficult to view when illuminated on an electronic display of an electronic display on which a machine-readable indicia is displayed. Due to physical and optical properties of electronic displays of electronic devices, the aiming signal may be dim or significantly reduced in brightness, thereby failing to provide an adequate visual indication for aiming when the aiming signal reflects from an electronic display of an electronic device.

To overcome the shortcomings associated with barcode scanning systems, the present disclosure includes implementations of systems and methods for a code reader that outputs an aiming signal to provide a visual indication for aiming the code reader on an electronic device. Utilizing the principles described herein, the code reader can provide an aiming signal visible to the user on edges of the electronic device or hand features of a user holding the electronic display to enable a user of the code reader to better aim the code at a machine-readable indicia displayed on an electronic display of the electronic device.

"Image data" as used herein may include raw images as well as processed images (e.g., cropped, compressed, etc.) from the raw images as well as other forms of data that is derived from raw image data that provides useful information for image analysis, such as descriptor data, histogram data, etc. Image data may include both individual image frames as well as multiple frames (e.g., streaming video). In some embodiments, raw images may include information arranged in two dimensions which are the x (width) and y (height) coordinates of a 2D sensor. The information at each x, y coordinate may include monochrome data, RGB data, depth data, multi-spectral data, infrared data, etc. as well as combinations thereof (e.g., RGB-depth may be captured by 3D cameras). Image data may be captured by one or more imagers positioned at various locations. Image data may also be captured by one or more imagers positioned external to a primary scanning unit, such as peripheral devices that may also provide image data. In some cases, image data and images may be used interchangeably herein.

Referring now to FIG. 1, an illustration of an illustrative scanning environment 100 with a code reader 102 scanning a machine-readable indicia 104 displayed on an electronic device 106 is shown. The scanning environment 100 includes hand features 108 of a user holding the electronic device 106 to display the machine-readable indicia 104 for the code reader 102 to image. The electronic device 106 has dimensions including a length L and a width W.

The code reader 102 may include any system, device, or apparatus configured to decode machine-readable indicia 104. For example, the code reader 102 may include a handheld barcode scanner or "gun"-style code reader, a fixed-position camera, a mobile computer, a wearable device, or any other device configured to scan, decode, or otherwise interact with machine-readable indicia 104. The code reader 102 may include electronics for decoding or scanning the machine-readable indicia, such as an imager (e.g., color sensor, monochrome sensor, etc.), optical elements (e.g., lenses, mirrors, etc.), active illumination sources (e.g., red, green, white, etc.) used for assisting with the imaging (e.g., barcode reading and/or object recognition), one or more processors (e.g., time domain reflectometry (TDR) processor, image processer, digital signal processor (DSP) co-processor, AI accelerator, etc.), and an aimer or aiming illumination source. The electronics of the code reader 102 (e.g., active illumination sources and aimer illumination source) may be programmable to be controlled as will be described more fully herein below.

The machine-readable indicia 104 can include any type of symbol, code, or pattern that can include stored (e.g., encoded) information and can be read by a machine, such as barcodes, QR codes, digital watermarks, and/or other forms of data representations. That is, the machine-readable indicia 104 (e.g., barcode) may include any arrangement of visual elements that can be processed and interpreted by the code reader 102 to extract encoded information. The electronic device 106 may include any electronic apparatus capable of displaying or otherwise presenting the machine-readable indicia 104 on an electronic display. Examples include, but are not limited to, cell phones, mobile phones, tablets, laptops, wearable devices, or other portable or stationary electronic devices. The electronic device 106 can have a length L, which may refer to a measurement of the device along a longer edge, and a width W, which may refer to a measurement of the device across shorter edge. Generally, "width" as used herein may refer to a defined distance in x and y directions on a surface including an electronic display.

The hand features 108 may include any part of a human hand or other appendages or digits used to hold, position, or otherwise interact with the electronic device 106 (e.g., wrist, fingernails, prosthetics, etc.). In some embodiments, the hand features 108 may include fingers, palms, thumbs, or other portions of a human hand securing or holding the device 104, as shown in FIG. 1. In some embodiments, hand features 108 may refer broadly to structural elements or positions involved in the handling and presentation of the electronic device 106 to the code reader 102.

Figure 2A:
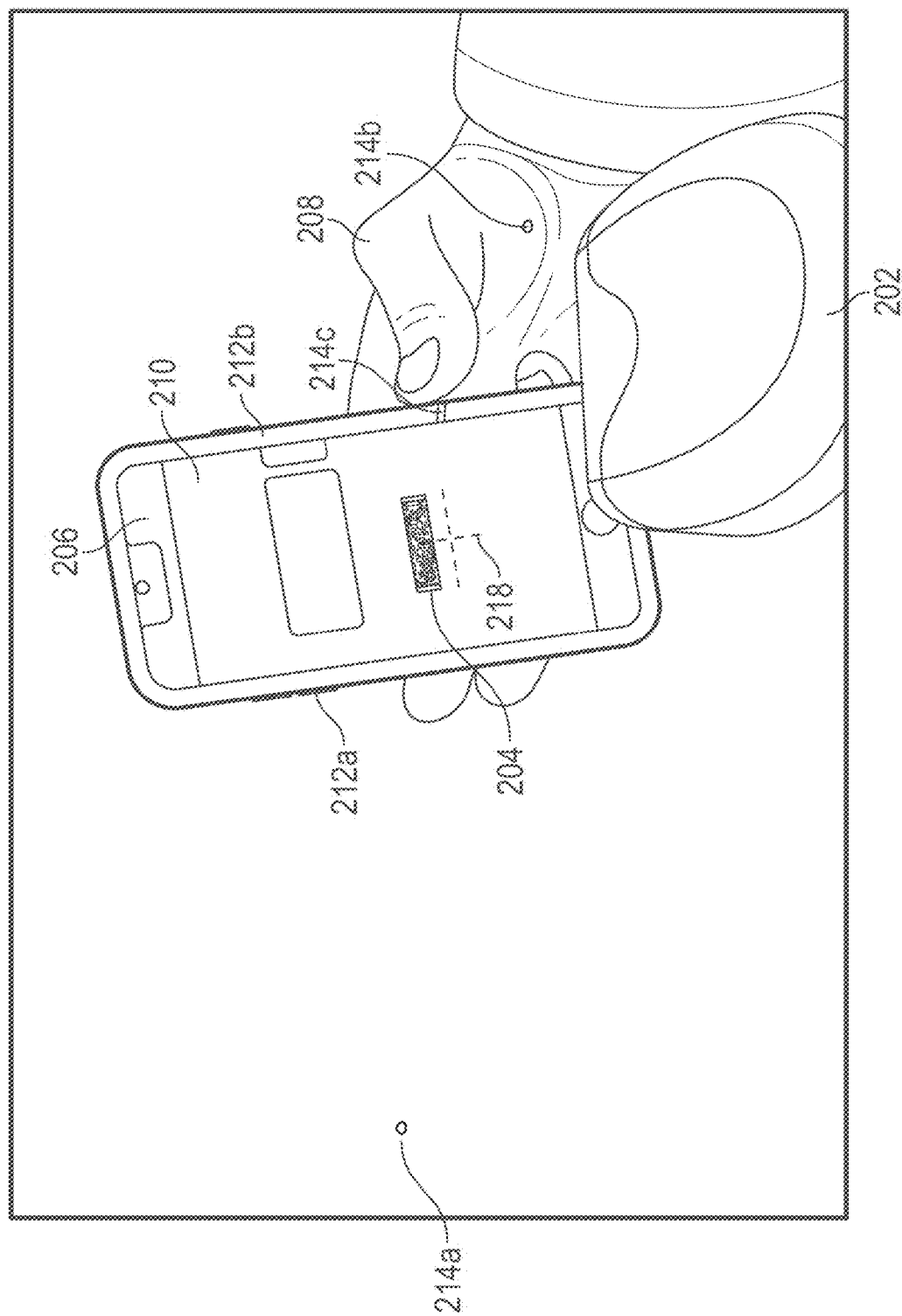
FIGS. 2A and 2B are illustrations of illustrative scanning environments with a code reader scanning a machine-readable indicia on an electronic device and product packaging, respectively.
Figure 2B:
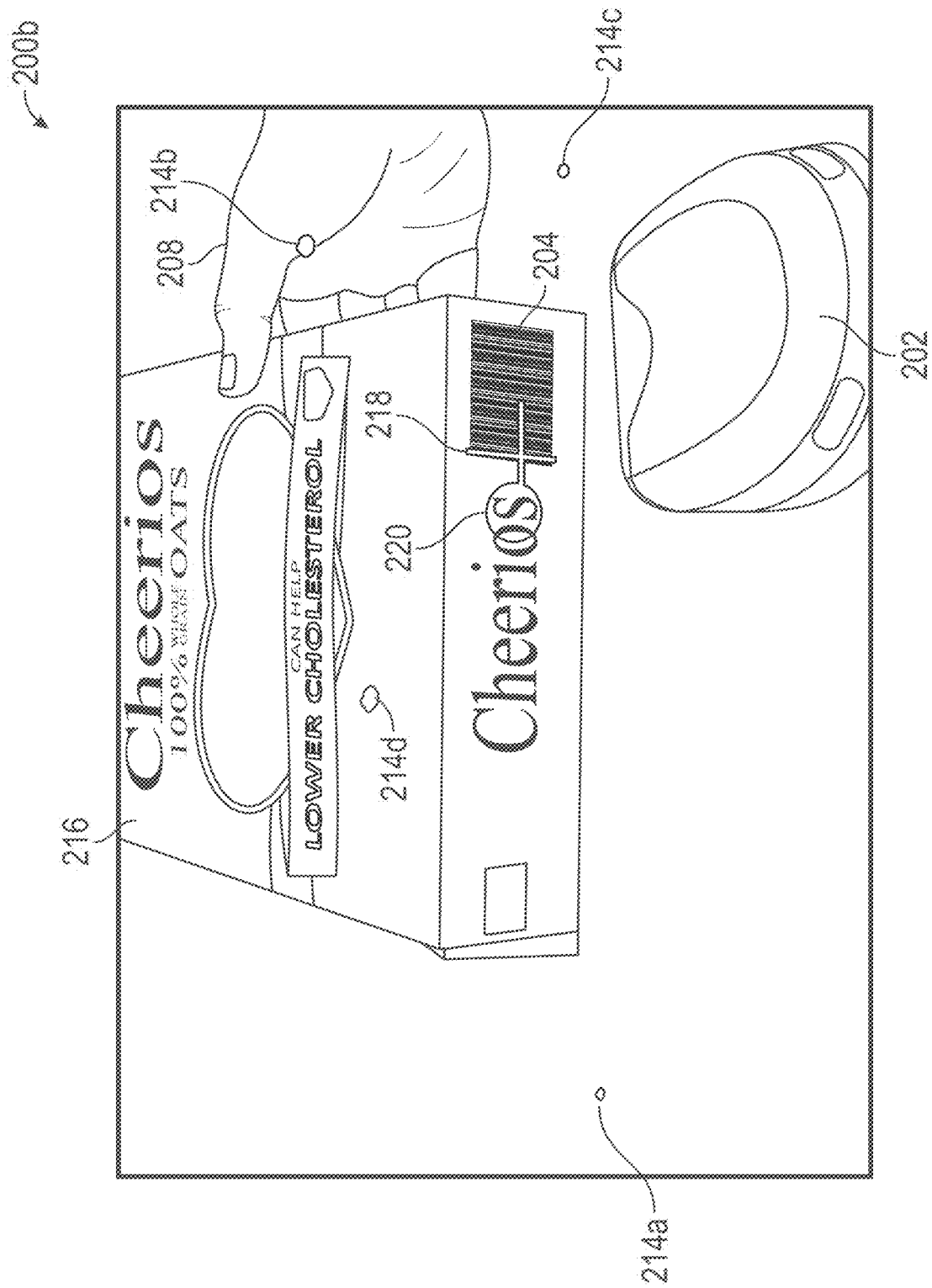

Referring generally to FIGS. 2A and 2B, illustrations of illustrative scanning environments 200a-200b with a bar code reader 202 scanning a machine-readable indicia 204a are shown, according to some embodiments. Referring now to FIG. 2A, an illustrative scanning environment 200a is shown. The scanning environment 200a includes a code reader 202, machine-readable indicia 204a, electronic device 206, and hand features 208. The electronic device 206 includes an electronic display 210 and frame edges 212a-212b (collectively, edges 212). The code reader 202 may output aiming signals, shown as points 214a-214d on and off object 216, in this case the electronic device 206.

The edges 212 of the electronic device 206 can broadly refer to boundaries that define the perimeter of the device, which may include the electronic display 210 or the non-display front face of the electronic device 206. Typically, the edges 212 correspond to sides of the electronic device 206 rather than a top or bottom, with "sides" or "edges" associated with the width or a shorter dimension of the electronic device 206. However, the edges 212 may also include other portions of the device 206, such as the top, bottom, or back, depending on the orientation and configuration of the electronic device 206 or other elements of the scanning environment 200a. The edges 212 may also be referred to herein as parallel edges that bound edges of the electronic display.

As further shown in FIG. 2A, the code reader 202 may output aiming signals, shown as points 214a-214c (collectively 214) and aiming pattern 218, which may be visible on and/or reflecting from various elements of the scanning environment 200a. The aiming pattern 218 may be intended to assist a user in aiming code reader 202 to scan or decode machine-readable indicia 204a by pointing the code reader 202 at the electronic device 206 and aligning the aiming signal to form points 214 and pattern 218 with the machine-readable indicia 204a. However, depending on the configuration and/or pattern of the aiming signal, the aiming pattern 218 may be difficult to see or obscured for a user of the code reader 202. For example, the electronic display 210 of the electronic device 206 may obscure or diminish the visibility of the aiming signal due to reflective properties, brightness, or other display characteristics. Thus, the code reader 202 may output an aiming signal that is mostly obscured by the electronic display 210 and not fully visible. The aiming signal may include a few faint points illuminating portions or elements of the scanning environment 200a. For example, point 214a may include a single dot reflecting from a floor in the scanning environment 200a, point 214b may include a single dot reflecting from hand features 208, and point 214c may include a single dot reflecting from edge 212b of the electronic device 206. As shown, these points are faint and can be difficult to view, and the aiming signal may thus be limited in effectiveness for assisting with aiming due to a major aiming portion of the aiming signal (e.g., aiming pattern 218, a large circle, crosshairs, etc.) being obscured or not fully visible.

Referring now to FIG. 2B, an illustration of illustrative scanning environment 200b is shown. The scanning environment 200b includes code reader 202, machine-readable indicia 204b, aiming points 214a-214c (collectively, aiming points 214), and object 216 (e.g., cereal box). The code reader 202 may further output aiming signals, shown as aiming pattern 218 and decode success pattern 220 (e.g., "good read" indicator). Generally, FIG. 2B illustrates a scenario where the object 216 on which the machine-readable indicia 204b is positioned may clearly reflect the aiming signal as the aiming pattern 218.

Referring generally to FIG. 3A-3C, illustrations of illustrative scanning environments 300a-300c are shown. Referring now to FIG. 3A, the scanning environment 300a includes an electronic device 302, machine-readable indicia 304, electronic display 306, aiming signals 308a-308m (collectively, aiming signal 308 formed of concentric light rings in an embodiment), hand features 310, and edges 312a-312b (collectively, edges 312). In some embodiments, the electronic device 302 may display the machine-readable indicia 304 with the electronic display 306 for decoding and/or scanning by a code reader (not shown on FIGS. 3A-3C).

For example, a user (e.g., a person having hand features 310 holding the electronic device 302 or, in some embodiments, another person or system) may activate a code reader (e.g., by pulling a trigger of the code reader, pressing a button, etc.) to output an aiming signal 308, for example. The aiming signal 308 may include an illumination signal (e.g., light) having various characteristics and configured to be output in various patterns. When applied to the electronic device 302, a portion of the aiming signal 308 may be faint (or not visible) on the backlit portions of the electronic display 306. Other portions of the aiming signal 308, however, may be visible to the user within the environment by illuminating the aiming signal 308 on the hand features 310 of the user and/or edges 312 of the electronic device 302 facing the code reader. The aiming signal 308 may be different than any active illumination used to assist with the decoding process, such that the aiming signal 308 may be used solely for aiming and may be asynchronous with the exposure of the imager.

The aiming signal 308b reflects from or is otherwise visible on the surface of the edge 312a. Further, the aiming signals 308a and 308c may reflect from or otherwise be visible on the hand features 310. The aiming signal 308 may include a light signal that illuminates and reflects an aiming pattern in the shape formed by the aiming signal 308. The user may adjust the aim of the code reader to point or direct the aiming signal 308. For example, based on the visual indication provided by the aiming signal 308, the user may move the code reader from the orientation shown in FIG. 3A to the orientation shown in FIG. 3B whereafter the machine-readable indicia 304 is centrally positioned.

Referring now to FIG. 3B, the scanning environment 300b includes an electronic device 302, machine-readable indicia 304, electronic display 306, aiming signals 308a-308m (collectively, aiming signal 308), hand features 310, and edges 312a-312b. The aiming signal 308 forms concentric rings 308a-308m, which can reflect from parallel edges (e.g., edges 312) of electronic device 302. For example, the aiming signal 308a may reflect from edge 312a (e.g., at least one edge), and the aiming signal 308b may reflect from edge 312b (e.g., an opposing edge). For example, because the aiming signal 308 is longer in at least one dimension than a width of the electronic device 302 (e.g., a width of the electronic device 302 outside of the electronic display 306, a distance between the edges 312, etc.), the aiming signal 308 may be visible on both edge 312a and edge 312b (shown by aiming signal 308m and aiming signal 308b, respectively when positioned in a manner in which one or more portions of the aiming pattern formed by the aiming signal 308 extends to both edges 312a and 312b) when the code reader is at a defined distance within a predetermined working range for the code reader to read the machine-readable indicia 304. Because the dimensions of the aiming signal 308 is larger relative to the field-of-view for imager of the code reader as compared to other conventional approaches, the aiming signal 308 may be visible on multiple edges (e.g., 312a, 312b) at both close distances and far distances within the predetermined working range for the code reader.

As shown in FIG. 3B, the aiming signal 308 may be centered or otherwise aimed such that the aiming signal 308 is reflecting from parallel edges of the electronic device 302. Further, the aiming signal 308 can reflect from the hand features 310, shown as aiming signal 308a. By forming an aiming pattern by the aiming signal 308 that is symmetric, a user may readily identify when a portion and which portion of the aiming signal 308 is illustrating one or more of the edges 312 or hand features 310 so as to adjust his or her aim of the code reader. Generally, the aiming signal 308 can enable a user to visually identify locations of the aiming signal 308 to aim the code reader and successfully decode the machine-readable indicia 304. For example, the user may visually identify the aiming signal 308a (e.g., on edge 312a), aiming signal 308b (e.g., on hand features 310), and aiming signal 308m (e.g., on edge 312b). Some embodiments of the aiming signal 308 are described in greater detail herein with regard to FIG. 4. As shown in FIG. 3B, the aiming signal 308m may be a first aiming signal shorter than a width (e.g., distance between edges 312) of the electronic device 302, and the aiming signal 308a may be a second aiming signal longer than the width of the electronic device 302. That is, the aiming signals 308a and 308m can include circular illumination patterns, with the circular illumination pattern of the aiming signal 308m having a diameter less than the width of electronic device 302 and the circular illumination pattern of the aiming signal 308a having a diameter greater than the width.

Referring now to FIG. 3C, the scanning environment 300c includes an electronic device 302, machine-readable indicia 304, electronic display 306, hand features 310, and edges 312a-312b (collectively, edges 312), and decode success signal 316 (also referred to as a "good read" signal). The decode success signal 316 may be an illumination signal and/or any other signal (e.g., audio, haptic, etc.) to indicate a successfully decoding (e.g., scanning) of the machine-readable indicia 304 by a code reader. In some embodiments, the decode success signal 316 can be a green circle or dot and can be presented to the user to notify user of the machine-readable indicia 304 being successfully decoded. As shown in FIG. 3C, for example, at least a portion of the decode success signal 316 can reflect from hand features 310 and/or edges 312, as described regarding the aiming signal 308 of FIGS. 3A-3B. That is, the decode success signal 316 can be longer in at least one dimension (e.g., a width corresponding to the direction between the edges 312) of the electronic device 302 and/or electronic display 306 to enable the user to receive visual notification of the code reader decoding the machine-readable indicia 304. In an embodiment, the decode success signal 316 may be any size or shape to enable the user to see a reflection from hand features 310 while holding both sides of the electronic device 302 and/or edges 312. In some embodiments, the decode success signal 316 may have similar a dimension and orientation as the aiming signal 308 such that the coverage area substantially overlaps, albeit the two signals may be enabled at different times.

Referring generally to FIGS. 4A-4C, scenes 400a-400c with aiming patterns 402a-402c (collectively, aiming patterns 402) are shown, according to some embodiments. As used herein, the aiming patterns 402 can include the same or similar features and/or functionality as described regarding the aiming signal 308 of FIGS. 3A-3C. Referring now to FIG. 4A, the scene 400a (e.g., scanning environment) includes aiming pattern 402a, aiming signals 404a-404n (collectively, aiming signals 404), a diameter D bounded by points 406a-406b (collectively, points 406), and corner signals 408a-408d (collectively, corner signals 408).

Generally, the aiming patterns 402 may include an arrangement of light or illumination signals projected in various shapes, colors, or configurations to assist a user in aiming a code reader to read a machine-readable indicia on an electronic display of an electronic device. For example, the aiming patterns 402 may include red illumination signals. The aiming pattern 402 can be output by a code reader using various types of electronics, as further described herein (e.g., with regard to FIG. 5). Generally, the electronics can include light-emitting diodes (LEDs), lasers, or any other light-emitting devices capable of producing a light or illumination signal that form an aiming pattern that is larger than a dimension of an electronic display at a predetermined distance within the working range of the code reader. The working range being defined as a distance range whereby successful decoding of a machine-readable indicia occurs. In some embodiments, the footprint of the aiming pattern 402 may be larger than at least half of the footprint of the field-of-view of the imager such that at least a majority of the field-of-view may be filled by the aiming pattern 402. In some embodiments, the aiming pattern 402 may be larger than the field-of-view, but the concentric features may nevertheless be indicative of a region within the field-of-view to guide a user to place the item therein. Additionally, the code reader may include various components, such as tunable lenses or other adjustable optics, to modify the output of the aiming pattern 402, as further described herein.

As shown on FIG. 4A, the aiming pattern 402a may have one or more aiming signals 404. In some embodiments, the aiming signals 404 can be symmetric (e.g., including multiple shapes of the same type and having similar dimensions or ratios of dimensions forming a repeating pattern). For example, the aiming signal 404n may be a center circle or dot, and the aiming signals 404a-404b (and others shown, but not specifically labeled) may be circles surrounding the center circle or dot in a "bullseye" or target pattern. That is, aiming signals 404a-404n may include concentric circles. An outer circle or other aiming signal (e.g., aiming signal 404a) may include points 406 defining a diameter D of the outer circle/aiming signal. In some embodiments, the diameter D may be longer than a width of a typical handheld electronic device such that locations of the aiming pattern 402a are visible on parallel edges of the electronic device at a predetermined distance within the working range of the code reader. That is, the aiming signal 404n may be a first aiming signal shorter than a width of an electronic device, and the aiming signal 404a may be a second aiming signal longer than the width of the electronic device. In some embodiments, the dimensions of the aiming pattern 402a may dynamically change responsive to determining a distance of the electronic device. The aiming pattern 402a and/or aiming signals 404 may include various additional and/or alternative patterns in other embodiments, such as the examples shown on FIGS. 4B-4C and others. In some embodiments, the aiming signals 404 may be equidistant (e.g., individual aiming signals 404a-404n located at equal distances relative to neighboring aiming signals 404). As the aiming signals 404 are relatively large compared to conventional aiming patterns, sufficient brightness of the aiming signals 404 are to be used to cause identifiable reflection. As described above, the aiming signals 404 may have a footprint of at least a majority of the field-of-view of the imager of the code reader, and in some cases a larger footprint. However, the aiming signals 404 are not used as the active illumination assisting the decoding of the code reader. Thus, the aiming signals 404 may be asynchronous with such active illumination, or otherwise not be active at the same time.

The corner signals 408 may include dots or other illumination signals to define and/or indicate the ends of the aiming pattern 402. In some embodiments, the corner signals 408 may indicate a field-of-view of a code reader. That is, the aiming pattern 402 can include corner signals 408 to prevent a user from attempting to scan a machine-readable indicia outside of the field-of-view of the code reader. Further, the corner signals 408 may provide a visual indication (e.g., by reflecting on edges, hand features, or other elements of a scene or scanning environment) to notify the user of the scan area limits of the code reader. In some embodiments, the corner signals 408 may be included in the aiming pattern 402, and in other embodiments, the corner signals 408 may not be included in the aiming pattern 402a. As shown in FIG. 4A, the corner signals 408 may be circles or dots (e.g., caused by light reflecting on a surface).

Referring now to FIG. 4B, the scene 400b includes aiming pattern 402b, aiming signals 410a-410n (collectively, aiming signals 410), a length L defined by points 412a-412b (collectively, points 412), and corner signals 414a-414d (collectively, corner signals 414). As shown on FIG. 4B, the aiming pattern 402b may include a similar configuration to that shown with regard to the aiming pattern 402a, but the aiming signals 410 may be concentric squares or rectangles. That is, the aiming signal 410n be a center square/rectangle or other signal, and may be surrounded or enclosed by additional square or rectangular illumination signals (e.g., aiming signal 410a) of the aiming pattern 402b. In some examples, the aiming pattern 402b can have a length L between points 412 such that the aiming pattern 402b is longer in at least one dimension than a width of an electronic device displaying a machine-readable indicia. Further, the corner signals 414a-414d may be squares/rectangles or other signals defining the outer edges of the aiming pattern 402b and/or a field-of-view of a code reader outputting the aiming pattern 402b.

Referring now to FIG. 4C, the scene 400c includes aiming pattern 402c, aiming signals $416a_1$-$416a_3$ and $416m_1$-$416m_3$ and 416n (collectively, aiming signals 416), sections 418a-418c (collectively, sections 418), corner signals 420a-420d (collectively, corner signals 420), and a radius R defined by points 422a-422b (collectively, points 422). As shown in FIG. 4C, the aiming pattern 402c may include a similar configuration to that shown with regard to the aiming pattern 402a (e.g., concentric circles), but the aiming pattern 402c may include sections 418 such that the aiming signals 416 do not illuminate certain at certain areas within a space (e.g., field-of-view) bounded by the corner signals 420. In other words, a concentric pattern may be discontinuous and include gaps between illuminated sections. In this example, there are three illuminated sections separated by three non-illuminated gaps in the aiming pattern 402c. Other arrangements are also contemplated including more gaps (e.g., four) and/or illuminated sections that have different sizes.

For example, sections 418 may define areas where no illumination is projected, and create a segmented pattern within the aiming pattern 402c. That is, one sector can include aiming signals $416a_1$-$416m_1$ including radial segments extending outward from a center point C to a distance defined by radius R, another sector can include aiming signals $416a_2$-$416m_2$ including radial segments in a similar configuration, and another sector can include aiming signals $416a_3$-$416m_3$ including radial segments in a similar configuration. In some embodiments, the radius R of the aiming pattern 402c is configured such that at least a portion of the aiming signals 416 of the aiming pattern 402c illuminates parallel edges (e.g., at least one edge and an opposing edge) of an electronic device.

Generally, the sections 418 or the sectors formed by the sections 418 may form a sectored or sectioned circular pattern displayed as aiming pattern 402c. The aiming signals 416 forming such sectors may be output by a code reader using multiple light sources (e.g., one LED or set of LEDs for each segment), by blocking one or more portions of a single light source, or otherwise. The sections 418 may generally include areas within the aiming pattern 402c where illumination is selectively blocked or not emitted, resulting in a non-continuous pattern that assists in visually segmenting a target area illuminated by the aiming pattern 402c. The sections 418 can also be included in configurations other than those implementing an aiming pattern with concentric circles, such as the implementation including the square or rectangular patterns shown in FIG. 4B, or in various implementations including various geometric shapes (e.g., symmetric triangles, octagons, ovals, asymmetric shapes, non-repeating patterns, etc.).

Figure 5:
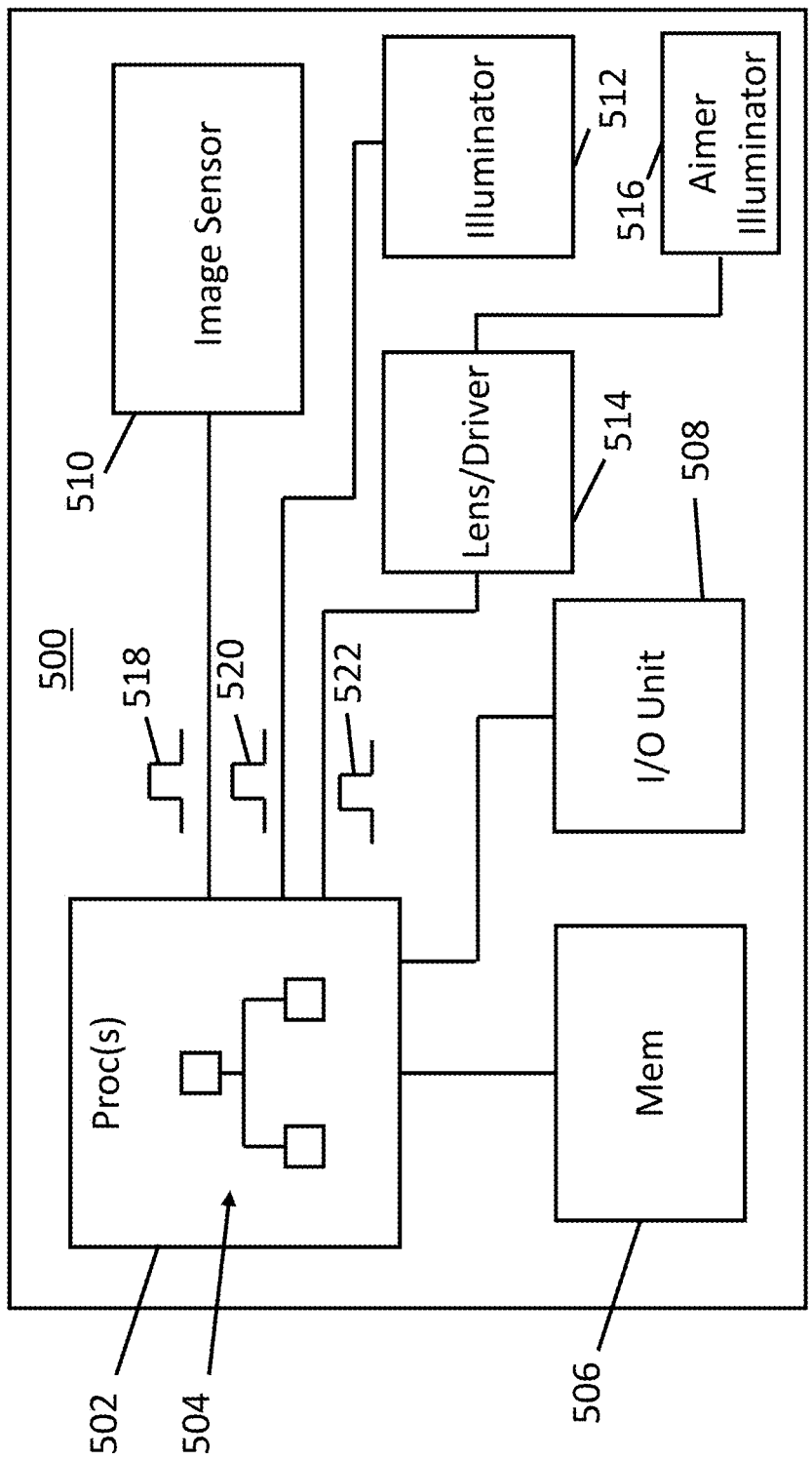
FIG. 5 is a block diagram of an illustrative code reader system.

Referring now to FIG. 5, a block diagram of an illustrative code reader 500 is shown. The code reader 500 may be inclusive of hardware that is controlled by software for imaging machine-readable indicia. The code reader 500 (or other system in which a code reader is operating) may include one or more processors 502 that execute software 504 for performing the functionality as described in the method 800 of FIG. 8. The processor(s) 502 may be in communication with a non-transitory memory 506, input/output unit 508, image sensor 510, illuminator 512, lens/driver 514, and aimer illuminator 516. The components of FIG. 5 may communicate through signals (e.g., signal 518, signal 520, and signal 522). Alternative components and/or processes may be utilized to configure the code readers, such as an external host computer, presetting, or an automatic setting algorithm. In various embodiments, the processor(s) 502 can execute software 504 to perform the various functions or processes described herein.

Generally, the processor(s) 502 can include one or more processors, such as FPGAS, microprocessors, and various additional types of processing systems and/or processing circuits. In some examples, the processor(s) 502 may be configured to image (e.g., receive from the image sensor 510 via the signal 518) a scene including a machine-readable indicia. The software 504 may further be configured to execute decoders and perform other code reading functions. The memory 506 can include instructions to causing the processor(s) 502 to execute one or more processes and/or functions as described herein (e.g., process 800 of FIG. 8).

In some examples, the processor(s) 502 can cause the illuminator 512 and/or aimer illuminator 516 to output an illumination signal (e.g., aiming signal, decode success illumination signal, etc.). For example, the illuminator 512 can be an LED or other light-emitting device and can be configured as a decode success illuminator. That is, the illuminator 512 may be configured to emit or output an illumination signal (e.g., circular green dot, etc.) responsive to the processor(s) 502 successfully decoding a machine-readable indicia (e.g., barcode, QR code, etc.) that is larger than at least one dimension (e.g., width) of an electronic display or edges thereof to enable a user to see the successful decode indicator.

Further, the processor(s) 502 may cause the aimer illuminator 516 to output an aiming signal (e.g., aiming signal 308, aiming patterns 402, etc.). The processor(s) may adjust the aiming signal output by the aimer illuminator 516 using the lens/driver 514. In some examples, the lens/driver 514 can be a tunable lens or any other device, system, or apparatus configured to alter a length or other dimension or characteristic of an aiming signal output by the aimer illuminator 516. For example, the lens/driver 514 may be a liquid lens configured to alter a size (e.g., width, length, diameter, radius, etc.) of an aiming signal output by aimer illuminator 516.

The aimer illuminator 516 can include LEDs or other light sources configured to output an aiming signal (e.g., aiming pattern). In some embodiments, the aimer illuminator 516 may adjust the aiming signal with the lens/driver 514. The aimer illuminator 516 may also adjust the aiming signal to change the shape, size, color, brightness, or other qualities of the aiming signal. The ability to change color may be achieved by separate LEDs on the aimer illuminator 516 for generating different colors, with the processor(s) 502 sending a triggering signal to enable/disable the appropriate LEDs responsive to the different activities detected. In some embodiments, the aimer illuminator 516 may include one or more multicolor LEDs that can produce different wavelengths as controlled by the processor(s) 502 for the desired effect. In some embodiments, the feedback may be provided by a separate system, such as the illuminator 512. In another example, one or more feedback LEDs located within the aimer illuminator 516 may generate feedback (e.g., a green spot, a yellow spot, etc.) within an area of the aiming pattern to provide a notification to a user (e.g., of successful/failed decoding). Rather than the aiming pattern being monocolor, multicolor aiming patterns may be used to help a user identify position of the aiming signal. For example, a left side may be red and right side may be blue. Alternative colors may be utilized.

In some embodiments, the code reader 500 may include additional elements or electronics (not shown). For example, the code reader 500 may include various input elements, such as a trigger to activate an aiming signal and/or cause the code reader 500 to decode a machine-readable indicia. The code reader 500 may also include a mode selector configured to enable the user to select various modes (e.g., first mode or a second mode). For example, the mode selector can include a button, switch or other user-interactive input element of code reader 500. In some examples, selecting the first mode with the mode selector can cause the aimer illuminator 516 to output the aiming signal being shorter in at least one dimension (e.g., an x direction in an x-y coordinate system, with x referring to a width or shorter edge-to-edge distance of a front surface of an electronic device and y referring to a height or longer edge-to-edge distance of a front surface of an electronic device) than a width of an electronic device. Further, selecting the second mode of the mode selector may cause the aimer illuminator 516 to output the aiming signal being longer in the at least one dimension than the width of the electronic device. In addition, second mode may cause brightness of the aiming signal to increase from the first mode due to the size increasing. Additional illustration sources may be turned or amplitude may increase of the same illumination source. The processor(s) 502 can execute additional software 504 to perform various functions and/or processes (e.g., increasing gain or brightness, detecting failed decoding, etc.), as further described regarding FIG. 6.

Figure 6:
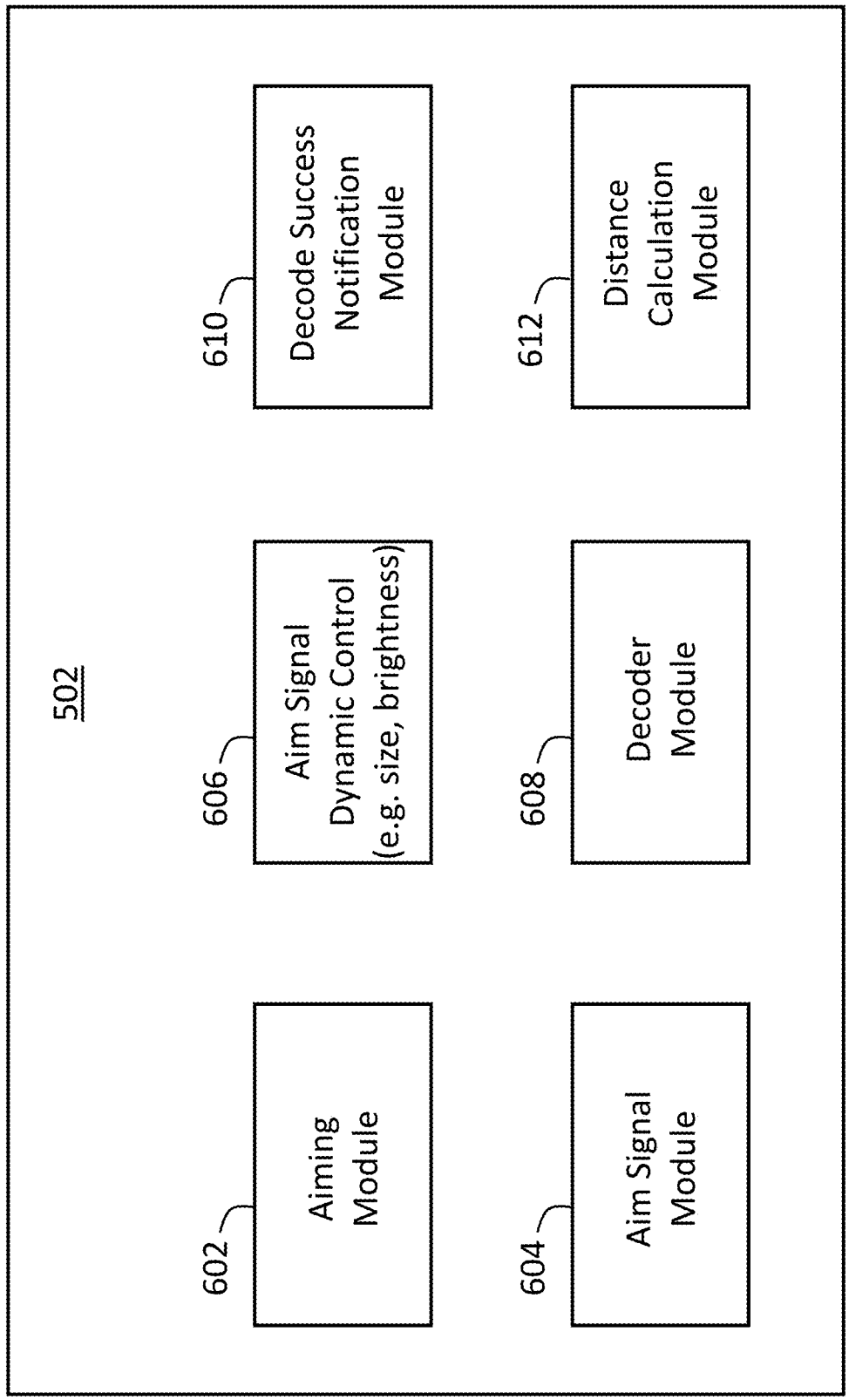
FIG. 6 is a block diagram of an illustrative processor of a code reader system.

Referring now to FIG. 6, a block diagram of illustrative processor(s) 502 of a code reader system is shown, according to some embodiments. The processor(s) 502 may include various subsystems and/or modules, such as an aiming module 602, an aim signal module 604, an aim signal dynamic control module 606, a decoder module 608, a decode success notification module 610, and a distance calculation module 612. In some embodiments, the aiming module 602, aim signal module 604, aim signal dynamic control module 606, decoder module 608, decode success notification module 610, and distance calculation module 612 may refer to software modules (e.g., modules of the software 504 of FIG. 5) executable by the processor(s) 502. Communication between the various components of FIG. 6 may be performed via physical connection (e.g., contacts) or a wireless communication protocol (e.g., Bluetooth, NFC, etc.)

Generally, the aiming module 602 can be configured to cause an image sensor (e.g., image sensor 510) to capture an image of a scene (e.g., scanning environment) including the machine-readable indicia. That is, the aiming module 602 can cause the image sensor to generate image data including the machine-readable indicia. The aim signal module 604 can enable the aimer illuminator (e.g., aimer illuminator 516) to output the aiming signal. For example, responsive to determining the code reader is to image a scene, the aiming signal module 606 can output a signal (e.g., digital control signal) to cause an aimer illuminator to output an aiming signal to assist a user in aiming a code reader. In some examples, the aiming signal module 606 causes an aimer illuminator to output an aiming signal longer in at least one dimension than a width of an electronic device including an electronic display at a defined distance on which the machine-readable indicia is displayed.

The aim signal dynamic control module 606 may be configured to adjust the aiming signal. Generally, the aim signal dynamic control module 606 can adjust various properties of the aiming signal, such as a size, brightness, gain, color, and/or pattern. In some embodiments, the aim signal dynamic control module 606 may output a signal to cause (e.g., via a tunable lens such as lens/driver 514 of FIG. 5) the aiming signal to increase in size to be longer in at least one dimension than a width of an electronic device to enable the aiming signal to illuminate at least one edge of the electronic device outside of the electronic display. The aim signal dynamic control module 606 may cause the aiming signal to use preset dimensions or dynamically increase until the aiming signal is sensed to reflect from two edge surfaces, as further described herein.

In another example, the aim signal dynamic control module 606 may adjust the brightness and/or gain of the aiming signal. For example, the aim signal dynamic control module 606 can identify at least a portion of the aiming signal captured by the image sensor as represented by the image data and disposed at the at least one edge of an electronic device or further outside the at least one edge (e.g., on hand features). The aim signal dynamic control module 606 can further determine that the brightness of the aiming signal is below the threshold level (e.g., a default or baseline level) and cause (e.g., by transmitting a digital control signal) the aimer illuminator to increase the brightness of the aiming signal until the brightness of the aiming signal crosses the threshold level.

Still referring to FIG. 6, the aim signal dynamic control module 606 may be configured to cause the aimer illuminator to output the aiming signal with increasingly higher gain (e.g., to cause a higher brightness when the aiming signal reflects from at least one edge of an electronic device) until the machine-readable indicia is decoded, fails to be decoded, or the machine-readable indicia is no longer in the scene (e.g., is removed, becomes obscured, etc.). In some examples, the aim signal dynamic control module 606 can also adjust the aiming signal based on data received from the distance calculation module 612. For example, the distance calculation module 612 module of the processor(s) 502 may identify the electronic display of the electronic device on which the machine-readable indicia is displayed (e.g., using object detection or similar technologies), and the aim signal dynamic control module 606 may cause the aiming signal to lengthen to be longer in the at least one dimension than the width of the electronic device.

In some embodiments, the aim signal dynamic control module 606 may be configured to output an aiming signal with a reduced illumination (e.g., dim) for a period (e.g., during a sleep period when the code reader is not in use). Further, the aim signal dynamic control module 606 may be configured to output an aiming signal with a reduced illumination signal during a first time period in which no activity is detected. In response to activity being detected, the aiming signal may be increased to more clearly show an aiming pattern to a user. The activity used to trigger the aim signal dynamic control module 606 to adjust (e.g. using a tunable lens) the aiming signal may be detected by the distance calculation module 612 detecting an item (or another object) entering a scene.

The dynamic aim signal control module 606 may further adjust the aiming signal or aiming pattern in response to various detections, determinations, and/or identifications. For example, the dynamic aim signal control module 606 can adjust the aiming signal/pattern to provide feedback to the user during scanning. That is, the aiming pattern may initially be produced in a first color (e.g., red) indicating where to present the item, and when the barcode is read (or on object is identified, etc.), the dynamic aim signal control module 606 can adjust the aiming signal to a second color (e.g., green) indicating to the customer that the code read was successful. Other feedback (e.g., audible beep) may accompany this visual feedback in various embodiments.

Generally, the decoder module 608 can decode a machine-readable indicia. For example, the decoder module 608 may be configured to analyze and interpret various types of encoded information embedded in the machine-readable indicia (e.g., via barcodes, QR codes, Data Matrix codes, or other standardized forms of data representation). Generally, the decoder module 608 may be configured to determine or identify information encoded as visual patterns or symbols in the indicia, extract the encoded data (e.g., in image data), and convert the encoded data into a format that is readable and/or actionable. The decoder module 608 may be configured to identify and extract data stored in machine-readable indicia using various encoding formats, such as binary encoding, alphanumeric encoding, or other complex data structures, and may be further configured to transform the decoded information into a structured format (e.g., ASCII text, binary data, etc.) for subsequent processing, storage, or for triggering actions (e.g., to indicate a successful and/or failed decoding, based on the content of the decoded information, etc.).

Still referring to FIG. 6, the decode success notification module 610 can be configured to provide notifications to a user. For example, in response to successfully decoding the machine-readable indicia (e.g., by the decoder module 608), the decode success notification module 610 can cause a notification of the machine-readable indicia being successfully decoded to be generated to notify the user of the successful decoding. For example, the notification can include outputting a decode success illumination signal (e.g., green circle or dot). In some embodiments, the decode success notification module 610 may be further configured to provide a notification (e.g., to a user) in response to determining a failed decoding.

Generally, the distance calculation module 612 can determine, calculate, or measure a distance. That is, the distance calculation module 612 can process image data and detect or identify various qualities of elements represented by the image data. For example, as described above, the distance calculation module 612 can include object detection to identify objects (e.g., electronics devices, edges of electronic devices, etc.) included in scanning environments or scenes imaged by a code reader. Further, the distance calculation module 612 can determine a distance between a code reader and a machine-readable indicia. The distance calculation and object detection functionalities of the distance calculation module 612 and processor(s) 502 are described in greater detail herein with regard to FIG. 7.

Figure 7:
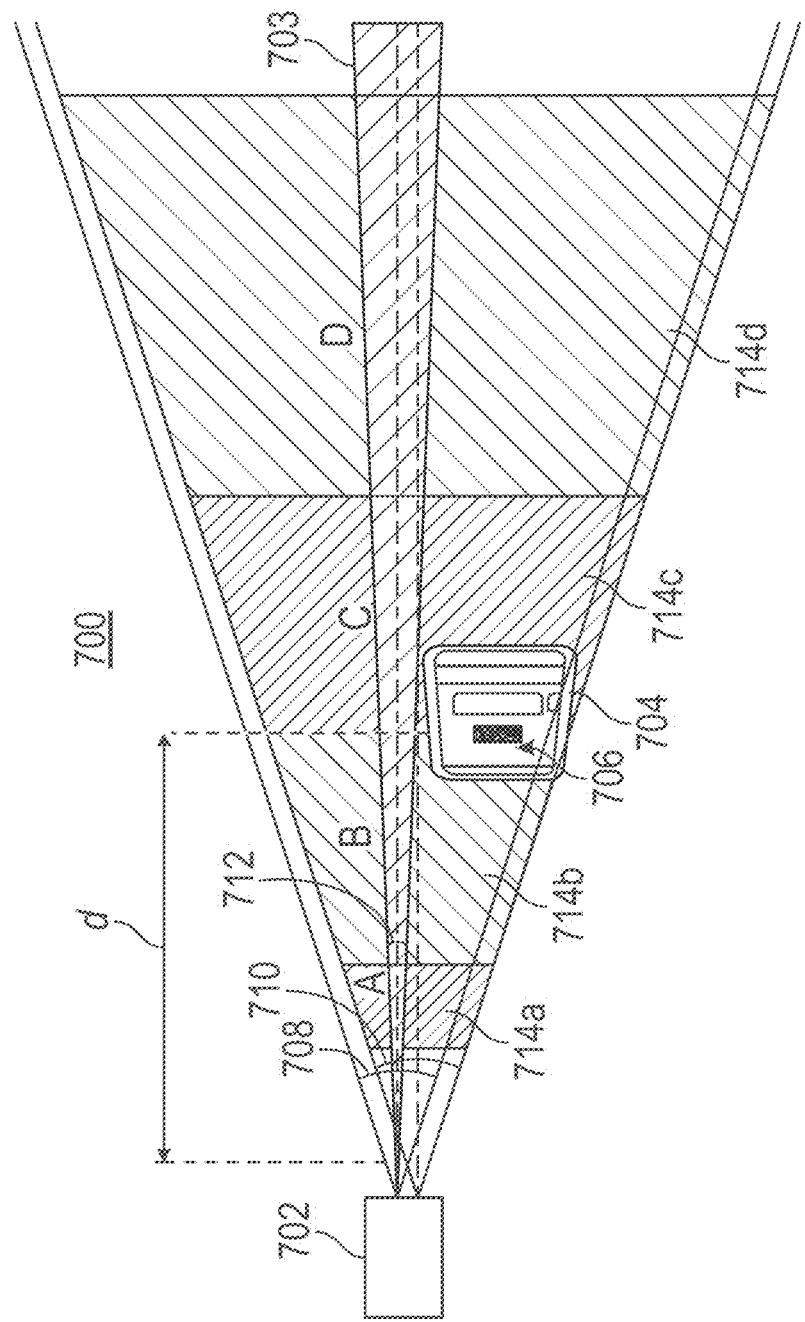
FIG. 7 is an illustration of an illustrative a code reader that is imaging an electronic device including projecting an aiming signal at a machine-readable indicia at various distances of the electronic device from the code reader.

Referring now to FIG. 7, an illustration of an illustrative scene 700 that is captured by a code reader 702, is shown, according to some embodiments. The code reader 702 is configured to capture an image of an electronic device 704 on which a machine-readable indicia 706 is displayed. A first angle 708, second angle 710, third angle 712, and zones 714a-714d (collectively, zones 714) are defined within the scene 700 as captured by the code reader 702. The zones 714 may correspond to respective distances d at which the electronic device 704 may be positioned. The code reader 702 may output an aiming signal 703. In some embodiments, the distance d may be a defined distance. As used herein, "defined distance" may refer to a focal length (e.g., of an image sensor or camera of the code reader 702) or brightness distance (e.g., of an aiming signal or light output by the code reader 702).

In some embodiments, the code reader 702 may be configured to detect the presence of the machine-readable indicia 706 and/or electronic device 704 in the scene 700. For example, the code reader 702 may include object detection to detect the electronic device 704 and/or to determine specific characteristics of the detected electronic device 704, such as edges. Generally, object detection can include the code reader 702 processing image data captured by image sensors to recognize and distinguish various objects within a scene or scanning environment, including identifying general objects and specific features like edges, corners, and surfaces. In some embodiments, the code reader 702 may include artificial intelligence (AI) or machine learning (ML) modules to facilitate object detection and/or distance detection. For example, the code reader 702 may include a neural network to identify or detect the electronic device 704 or machine readable-indicia 706, and to identify or detect the aiming signal reflecting from locations on edges of the electronic device 704.

Further, the code reader 702 may be configured to measure or detect the distance d at which the electronic device 704 is positioned from the code reader 702 (e.g., the distance of a portion of the aiming signal 703 from the code reader 702 to the electronic device 704 and/or hand features holding the electronic device 704). For example, the code reader may capture image data including data representing the distance d (e.g., corresponding to a location between the zone 714b and the zone 714c, as shown in FIG. 7). The code reader 702 may have a field-of-view defined by first angle 708 or second angle 710 or corresponding with the aiming signal 703. For example, the first angle 708 may correspond to a field-of-view of the code reader 702 in a first position, and the second angle 710 may correspond to the field-of-view of the code reader 702 in a second position. Further, the angle 712 may correspond to a projection angle of the aiming signal 703 output by the code reader 702. That is, the aiming signal 703 output by code reader 702 may increase in size (e.g., radially) as the distance d increases and can decrease in size as the distance d decreases according to geometries defined by the angle 712. Because the brightness of an aiming signal can be generally understood to decrease as the distance between the aiming source and reflecting surface increases, the code reader 702 may adjust a gain or other parameter when outputting the aiming signal 703 to increase the brightness of the aiming signal 703 (e.g., as described regarding the aim signal dynamic control module of FIG. 6) to enable the user to see the aiming signal 703 as an aiming pattern on the electronic device 704. The code reader 702 may be further configured to adjust the size of the aiming signal 703 based on the detected distance d (e.g., to decrease a diameter, length, or other dimension responsive to detecting an increase in the distance d and thereby providing a smaller and brighter signal).

Figure 8:
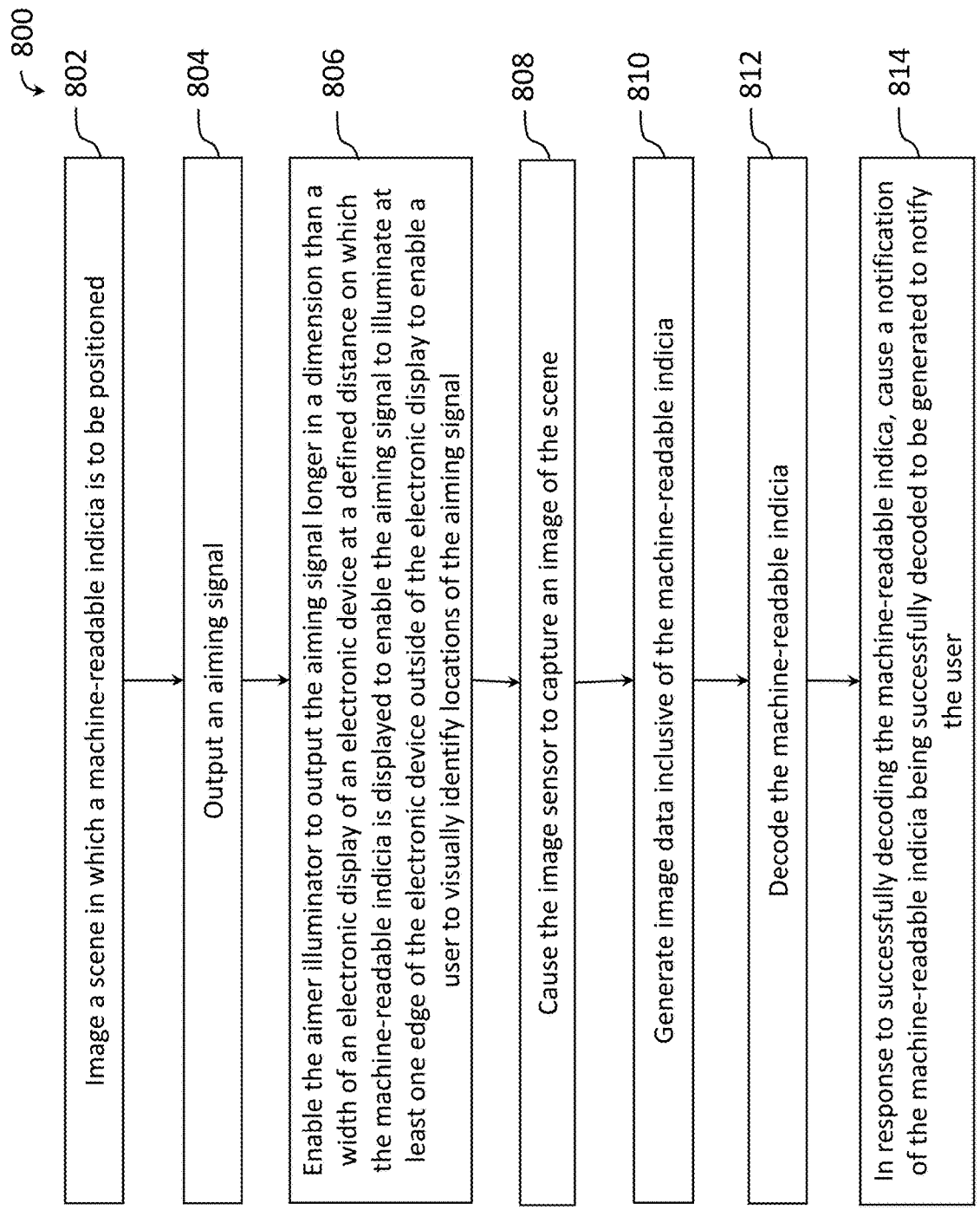
FIG. 8 is a flowchart for an illustrative process for a code reader to project an aiming signal according to the principles described herein.

Referring now to FIG. 8, a block diagram of an illustrative process 800 for a code reader is shown, according to some embodiments. One or more of the components described herein can be used to perform the steps of process 800 (e.g., code reader 702 of FIG. 7). Additional, fewer, or different operations may be performed depending on the particular arrangement. In some embodiments, some, or all operations of process 800 can be performed by one or more processors executing on one or more computing devices, systems, or servers. In some embodiments, each operation may be re-ordered, added, removed, or repeated.

In some embodiments, at block 802, the process 800 may include imaging a scene. For example, an image sensor (e.g., image sensor 510 of FIG. 5) may capture image data representing a scene with a machine-readable indicia, such as a barcode, QR code, or other machine-readable indicia positioned within the scene. In some embodiments, at block 804, the process 800 may further include outputting an aiming signal. That is, outputting can include an aimer illuminator (e.g., aimer illuminator 516) generating or providing an illumination signal including an aiming pattern or other output configuration to assist a user in aiming the code reader.

In some embodiments, at block 806, the process 800 can further include enabling the aimer illuminator to output the aiming signal forming an aiming pattern being longer in a dimension than a width of an electronic display of an electronic device at a defined distance on which the machine-readable indicia is displayed to enable the aiming signal to illuminate at least one edge of the electronic device (e.g., an edge outside of the electronic display) with the aiming pattern to enable a user to visually identify locations of the aiming signal. For example, the aimer illuminator (e.g., code reader 500) can output an aiming signal with multiple concentric shapes forming a repeating pattern surrounding a center point, and the aimer illuminator may output the aiming signal such that at least a portion of the aiming pattern is visible on an edge of an electronic device.

Further, still referring to block 806, the aimer illuminator may output the aiming signal based on a defined distance corresponding to the distance between the electronic device/machine-readable indicia and the code reader. That is, the aimer illuminator may output the aiming signal such that aiming signal includes portions (e.g., largest half of concentric circles) longer than at least one edge of the electronic device and then illuminate at least one of the edges of the device and enable a user to visually identify such illuminated portions. As used herein, "defined distance" may refer to a focal length of an image sensor or camera of the code reader or brightness distance (e.g., of an aiming signal or light output by the code reader).

In some embodiments, at block 808, the process 800 may further include causing the image sensor to capture an image of the scene by the image sensor. For example, at block 808, one or more processors (e.g., processor(s) 502) may transmit a signal to an image sensor (e.g., camera or other device) that causes the image sensor to capture an image of the scene including the electronic device and machine-readable indicia being displayed on the electronic display. In some embodiments, at block 808, the process 800 may further include generating image data inclusive of the machine-readable indicia. That is, responsive to the image sensor capturing an image, one or more processors may generate image data representing the scene and the included code.

In some embodiments, at block 812, the process 800 may further include decoding the machine-readable indicia. Generally, decoding the machine-readable indicia at block 812 may involve one or more processors analyzing the captured image data, extracting encoded information, and interpreting the encoded information to produce a usable, readable, or decoded output. Decoding at block 812 may include various operations, including reading barcodes, QR codes, or other symbols, applying error correction techniques, and converting the decoded data into a format that can be further processed or utilized. In some embodiments, at block 814, in response to successfully decoding the machine-readable indicia, the process 800 may further include causing a notification of the machine-readable indicia being successfully decoded to be generated to notify the user. For example, one or more processors may adjust the aiming signal and/or provide another illumination signal, such as displaying a green circle or other visual and/or non-visual indicator, to signify that the code has been successfully read (e.g., decoded).

Some embodiments relate to a code reader. The code reader may include an image sensor configured to image a scene in which a machine-readable indicia is to be positioned. The code reader may further include an aimer illuminator configured to output an aiming signal. The code reader may further include at least one processor in communication with the image sensor and aimer illuminator. The processor(s) may be configured to enable the aimer illuminator to output the aiming signal. The aiming signal (e.g., concentric circles with a diameter longer than a width of a mobile phone front face) may be longer in at least one dimension than a width of an electronic device including an electronic display at a defined distance on which the machine-readable indicia is displayed to enable the aiming signal to illuminate at least one edge of the electronic device outside of the electronic display to enable a user to visually identify locations of the aiming signal. The processor(s) may be further configured to cause the image sensor to capture an image of the scene inclusive of the machine-readable indicia. The processor(s) may be further configured to cause the image sensor to generate image data inclusive of the machine-readable indicia. The processor(s) may be further configured to decode the machine-readable indicia. In response to successfully decoding the machine-readable indicia, the processor(s) may be further configured to cause a notification of the machine-readable indicia being successfully decoded to be generated to notify the user of the successful decoding.

In some embodiments, the aiming signal includes a first aiming signal shorter than the width of the electronic device and a second aiming signal longer than the width of the electronic devices.

In some embodiments, the processor(s) may be further configured to identify at least a portion of the aiming pattern produced by the aiming signal captured by the image sensor as represented by the image data and disposed at the at least one edge or further outside the edge(s). The processor(s) may be further configured to determine that the brightness of the aiming pattern is below the threshold level. The processor(s) may be further configured to cause the aimer illuminator to increase the brightness until the brightness of the aiming pattern crosses the threshold level.

In some embodiments, the processor(s) may be further configured to identify the electronic display of the electronic device on which the machine-readable indicia is displayed. The processor(s) may be further configured to cause the aiming pattern to lengthen to be longer in the dimension(s) than the width of the face of the electronic device.

In some embodiments, the code reader may further include a tunable lens configured to alter a length of the aiming pattern. In some embodiments, the processor(s) may be further configured to cause the tunable lens to be altered to cause the aiming pattern to be longer than the at least one dimension.

In some embodiments, the processor(s) may be further configured to detect that the aiming signal is reflecting from parallel edges or on hand features of the user positioned on the edge(s) and at an opposing edge of the electronic display or hand feature. The processor(s) may be further configured to cause the tunable lens to stop altering the length of the aiming pattern in response to detecting that the aiming signal is detected from the parallel edges or hand features at opposing edges.

In some embodiments, the code reader may further include a decode success illuminator configured to output an illumination signal to display a decode success pattern indicative of the processor(s) successfully decoding the machine-readable indicia. In some embodiments, the decode success pattern may include at least one dimension being longer than the width of the electronic device at the defined distance.

In some embodiments, the code reader may further include a mode selector configured to enable the user to select a first mode or a second mode. The first mode may cause the aimer illuminator to output the aiming signal to form the aiming pattern being shorter in the dimension(s) than the width of the electronic device. The second mode may cause the aimer illuminator to output the aiming signal being to form the aiming pattern being longer in the dimension(s) than the width of the face of the electronic device.

In some embodiments, the processor(s) are further configured to cause the aimer illuminator to output the aiming signal to form the aiming pattern with increasingly higher gain to increase in brightness when reflecting from the at least one edge of the electronic device until the machine-readable indicia is decoded, fails to be decoded, or the machine-readable indicia is no longer in the scene.

In some embodiments, the aiming signal forms the aiming pattern to be symmetric.

Some embodiments relate to a method. The method may include imaging, by an image sensor of a code reader, a scene in which a machine-readable indicia is to be positioned. The method may include outputting, by an aimer illuminator of the code reader, an aiming signal. The method may include enabling, by processor(s) of the code reader in communication with the image sensor and aimer illuminator, the aimer illuminator to output the aiming signal. The aiming signal may form an aiming pattern being longer in at least one dimension than a width of an electronic device including an electronic display at a defined distance on which the machine-readable indicia is displayed to enable the aiming signal to illuminate at least one edge of the electronic device to enable a user to visually identify locations of the aiming signal. The method may include causing, by the processor(s), the image sensor to capture an image of the scene inclusive of the machine-readable indicia being displayed on the electronic display to generate image data inclusive of the machine-readable indicia. The method may include decoding the machine-readable indicia. In response to successfully decoding the machine-readable indicia, the method may include causing a notification of the machine-readable indicia being successfully decoded to be generated to notify the user of the successful decoding.

In some embodiments, outputting the aiming signal may include outputting a first aiming signal shorter than the width of the electronic device and a second aiming signal longer than the width of the electronic device.

In some embodiments, the method may further include identifying, by the processor(s), at least a portion of the aiming pattern captured by the image sensor as represented by the image data and disposed at the at least one edge or further outside the at least one edge. The method may further include determining, by the processor(s), that the brightness of the aiming pattern is below the threshold level. The method may further include causing, by the at least one processor, the aimer illuminator to increase the brightness until the brightness of the aiming pattern crosses the threshold level.

In some embodiments, the method may further include identifying, by the processor(s), the electronic device on which the machine-readable indicia is displayed. In some embodiments, the method may include causing, by the processor(s), the aiming pattern to lengthen to be longer in the dimension(s) than the width of the electronic device.

In some embodiments, the method may further include utilizing a tunable lens of the code reader to enable a length of the aiming pattern to be altered. The method may further include causing, by the at processor(s), the tunable lens to be altered to cause the aiming pattern to be longer in the dimension(s).

In some embodiments, the method may further include detecting, by the processor(s), that the aiming pattern is reflecting from parallel edges or on hand features of the user positioned on the at least one edge and at an opposing edge of the electronic display or hand feature. The method may further include causing, by the processor(s), the tunable lens to stop altering the length of the aiming pattern in response to detecting that the aiming pattern is detected from the parallel edges or hand features at opposing edges.

In some embodiments, the method may further include outputting, by a decode success illuminator of the code reader, an illumination pattern indicative of the processor(s) successfully decoding the machine-readable indicia, the illumination signal including at least one dimension being longer than the width of the electronic device at the defined distance.

In some embodiments, the method may further include enabling, by a mode selector of the code reader, the user to select a first mode or a second mode. The first mode may cause the aimer illuminator to output the aiming pattern being shorter in the dimension(s) than the width of the electronic device. The second mode may cause the aimer illuminator to output the aiming pattern being longer in the at least one dimension than the width of the electronic device.

In some embodiments, the method may further include causing, by the processor(s), the aimer illuminator to output the aiming signal with increasingly higher gain to increase in brightness when reflecting from the at least one edge of the electronic device until the machine-readable indicia is decoded, fails to be decoded, or the machine-readable indicia is no longer in the scene.

In some embodiments, the aiming signal causes the aiming pattern to be symmetric.

The illustrations included herewith are not meant to be actual views of any particular systems, memory device, architecture, or process, but are merely idealized representations that are employed to describe embodiments herein. Elements and features common between figures may retain the same numerical designation except that, for ease of following the description, for the most part, reference numerals begin with the number of the drawing on which the elements are introduced or most fully described. In addition, the elements illustrated in the figures are schematic in nature, and many details regarding the physical layout and construction of a memory array and/or all steps necessary to access data may not be described as they would be understood by those of ordinary skill in the art.

As used herein, the singular forms "a," "an," and "the" are intended to include the plural forms as well, unless the context clearly indicates otherwise.

As used herein, "or" includes any and all combinations of one or more of the associated listed items in both, the conjunctive and disjunctive senses. Any intended descriptions of the "exclusive-or" relationship will be specifically called out.

As used herein, the term "configured" refers to a structural arrangement such as size, shape, material composition, physical construction, logical construction (e.g., programming, operational parameter setting) or other operative arrangement of at least one structure and at least one apparatus facilitating the operation thereof in a defined way (e.g., to carry out a specific function or set of functions).

As used herein, the phrases "coupled to" or "coupled with" refer to structures operably connected with each other, such as connected through a direct connection or through an indirect connection (e.g., via another structure or component).

The foregoing method descriptions and/or any process flow diagrams are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to and/or in communication with another code segment or a hardware circuit by passing and/or receiving information, data, arguments, parameters, or memory contents. Information, arguments, parameters, data, etc. may be communicated (e.g., passed, forwarded, and/or transmitted) via any suitable means including memory sharing, message passing, token passing, network transmission, etc.

The actual software code or specialized control hardware used to implement these systems and methods is not limiting of the disclosure. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The previous description is of various preferred embodiments for implementing the disclosure, and the scope of the invention should not necessarily be limited by this description. The scope of the present invention is instead defined by the claims.

What is claimed is:

1. A code reader, comprising:
   an image sensor configured to image a scene in which a machine-readable indicia is to be positioned;
   an aimer illuminator configured to output an aiming signal to cause an aiming pattern to be displayed on an illuminated surface;
   at least one processor in communication with the image sensor and aimer illuminator and configured to:
   enable the aimer illuminator to output the aiming signal, the aiming signal being longer in at least one dimension than a width of a face of an electronic device including an electronic display at a defined distance within a working range of the code reader on which the machine-readable indicia is displayed to enable the aiming signal to illuminate at least one edge of the electronic device outside of the electronic display with the aiming pattern to enable a user to visually identify locations of the aiming signal;
   cause the image sensor to capture an image of the scene inclusive of the machine-readable indicia being displayed on the electronic display to generate image data inclusive of the machine-readable indicia;
   decode the machine-readable indicia; and
   in response to successfully decoding the machine-readable indicia, cause a notification of the machine-readable indicia being successfully decoded to be generated to notify the user of the successful decoding.

2. The code reader according to claim 1, wherein the aiming signal includes:
a first aiming signal shorter than the width of the face of the electronic device; and
a second aiming signal longer than the width of the face of the electronic device.

3. The code reader according to claim 1, wherein the at least one processor is further configured to:
identify at least a portion of the aiming pattern produced by the aiming signal captured by the image sensor as represented by the image data and disposed at the at least one edge or further outside the at least one edge of the electronic device;
determine that brightness of the aiming pattern is below a threshold level; and
cause the aimer illuminator to increase the brightness until the brightness of the aiming pattern crosses the threshold level.

4. The code reader according to claim 1, wherein the at least one processor is further configured to:
identify the electronic display of the electronic device on which the machine-readable indicia is displayed; and
cause the aiming pattern to lengthen to be longer in the at least one dimension than the width of the face of the electronic device.

5. The code reader according to claim 4, further comprising:
a tunable lens configured to alter a length of the aiming pattern; and
wherein the at least one processor is further configured to cause the tunable lens to be altered to cause the aiming pattern to be longer than the at least one dimension.

6. The code reader according to claim 5, wherein the at least one processor is further configured to:
detect that the aiming signal is reflecting from parallel edges of the electronic device or on hand features of the user positioned on the at least one edge and at an opposing edge of the electronic display or hand feature; and
cause the tunable lens to stop altering the length of the aiming pattern in response to detecting that the aiming signal is detected from the parallel edges of the electronic device or hand features at opposing edges of the electronic device.

7. The code reader according to claim 1, further comprising a decode success illuminator configured to output an illumination signal to display a decode success pattern indicative of the at least one processor successfully decoding the machine-readable indicia, the decode success pattern including at least one dimension being longer than the width of the electronic device at the defined distance.

8. The code reader according to claim 1, further comprising a mode selector configured to enable the user to select a first mode or a second mode, the first mode causing the aimer illuminator to output the aiming signal to form the aiming pattern being shorter in the at least one dimension than the width of the electronic device, the second mode causing the aimer illuminator to output the aiming signal to form the aiming pattern being longer in the at least one dimension than the width of the face of the electronic device.

9. The code reader according to claim 1, wherein the at least one processor is further configured to cause the aimer illuminator to output the aiming signal with increasingly higher gain to increase in brightness when reflecting from the at least one edge of the electronic device until the machine-readable indicia is decoded, fails to be decoded, or the machine-readable indicia is no longer in the scene.

10. The code reader according to claim 1, wherein the aiming signal forms the aiming pattern to be symmetric.

11. A method comprising:
imaging, by an image sensor of a code reader, a scene in which a machine-readable indicia is to be positioned;
outputting, by an aimer illuminator of the code reader, an aiming signal;
enabling, by at least one processor of the code reader in communication with the image sensor and aimer illuminator, the aimer illuminator to output the aiming signal, the aiming signal forming an aiming pattern being longer in at least one dimension than a width of an electronic device including an electronic display at a defined distance within a working range of the code reader on which the machine-readable indicia is displayed to enable the aiming signal to illuminate at least one edge of the electronic device with the aiming pattern to enable a user to visually identify locations of the aiming signal;
causing, by the at least one processor, the image sensor to capture an image of the scene inclusive of the machine-readable indicia being displayed on the electronic display
to generate image data inclusive of the machine-readable indicia;
decoding the machine-readable indicia; and
in response to successfully decoding the machine-readable indicia, causing a notification of the machine-readable indicia being successfully decoded to be generated to notify the user of the successful decoding.

12. The method according to claim 11, wherein outputting the aiming signal comprises outputting an aiming signal having a plurality of concentric shapes.

13. The method according to claim 11, further comprising:
identifying, by the at least one processor, at least a portion of the aiming pattern captured by the image sensor as represented by the image data and disposed at the at least one edge of the electronic device or further outside the at least one edge of the electronic device;
determining, by the at least one processor, that brightness of the aiming pattern is below a threshold level; and
causing, by the at least one processor, the aimer illuminator to increase the brightness until the brightness of the aiming pattern crosses the threshold level.

14. The method according to claim 11, wherein a footprint of the aiming pattern has a dimension that is at least half of a length of the field-of-view of the code reader.

15. The method according to claim 14, wherein the footprint of the aiming pattern has a dimension that is longer than a length of a field-of-view of the code reader.

16. The method according to claim 15, wherein the aiming pattern is different than an illumination signal used for imaging the machine-readable indicia for decoding.

17. The method according to claim 11, further comprising dynamically adjusting at least one dimension of the aiming pattern based on a detected distance from the electronic display.

18. The method according to claim 11, further comprising enabling, by a mode selector of the code reader, the user to select a first mode or a second mode, the first mode causing the aimer illuminator to output the aiming pattern being shorter in the at least one dimension than the width of the electronic device, the second mode causing the aimer illuminator to output the aiming pattern being longer in the at least one dimension than the width of the electronic device.

19. The method according to claim 11, further comprising causing, by the at least one processor the aimer illuminator to output the aiming signal with increasingly higher gain to increase in brightness when reflecting from the at least one edge of the electronic device until the machine-readable indicia is decoded, fails to be decoded, or the machine-readable indicia is no longer in the scene.

20. The method according to claim 11, wherein the aiming signal causes the aiming pattern to be symmetric.

* * * * *